Nov. 15, 1938.　　　G. E. ATKINS　　　2,136,602
TELETYPEWRITER PROJECTOR
Filed Aug. 22, 1936　　　6 Sheets-Sheet 1

INVENTOR
G. E. ATKINS
BY
J. W. Schmied
ATTORNEY

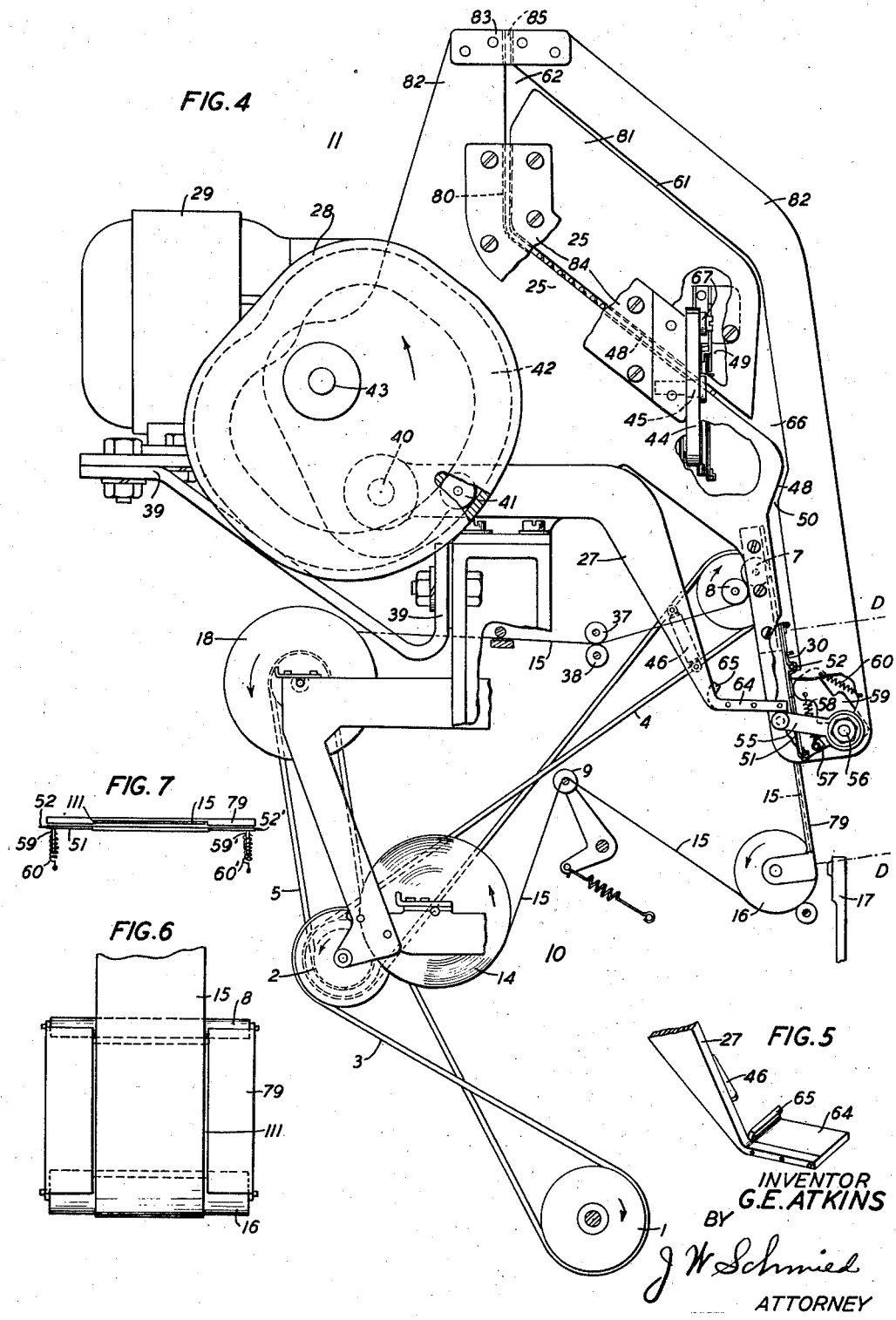

Nov. 15, 1938.  G. E. ATKINS  2,136,602
TELETYPEWRITER PROJECTOR
Filed Aug. 22, 1936  6 Sheets-Sheet 3

INVENTOR
G. E. ATKINS
BY
J. W. Schmied
ATTORNEY

Nov. 15, 1938.　　　　　G. E. ATKINS　　　　　2,136,602
TELETYPEWRITER PROJECTOR
Filed Aug. 22, 1936　　　6 Sheets-Sheet 4

INVENTOR
G.E.ATKINS
BY
J.W.Schmied
ATTORNEY

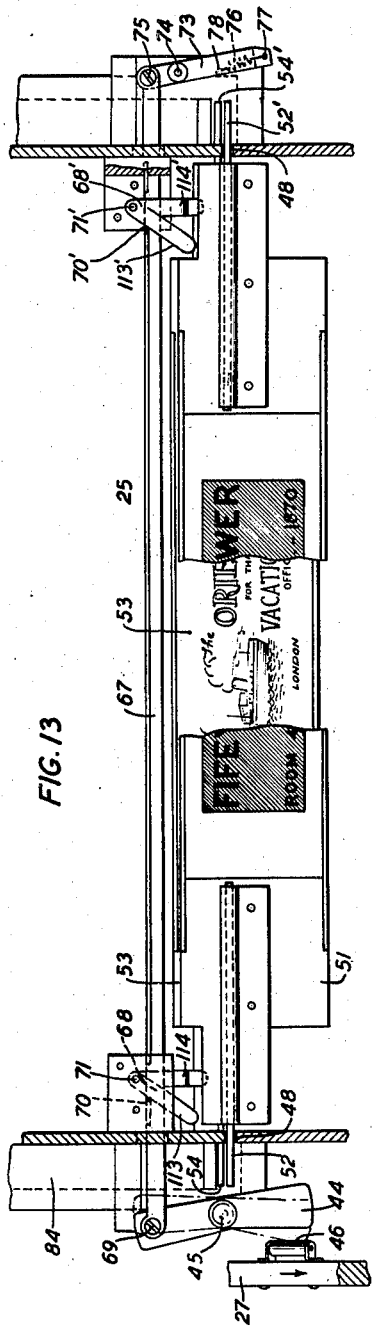
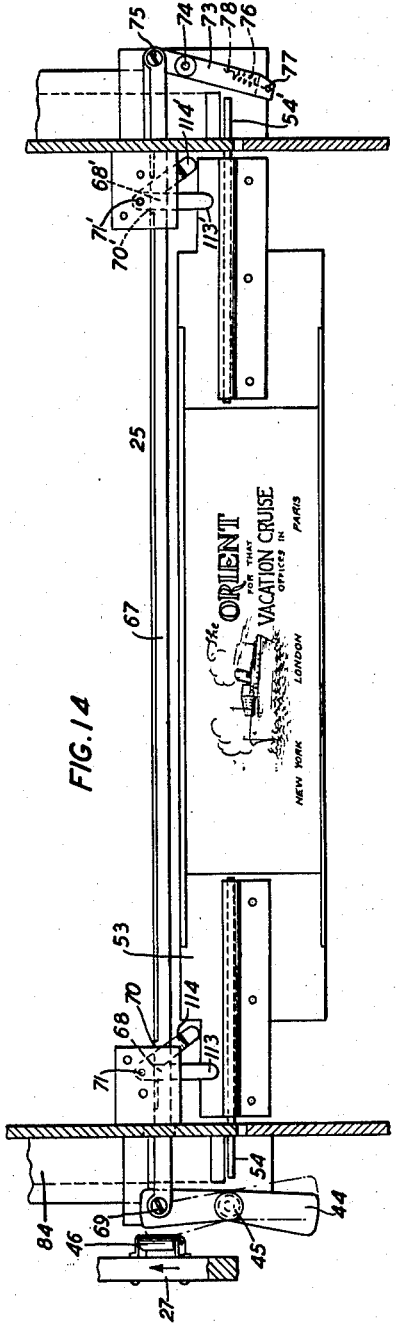

Nov. 15, 1938.  G. E. ATKINS  2,136,602
TELETYPEWRITER PROJECTOR
Filed Aug. 22, 1936  6 Sheets-Sheet 6
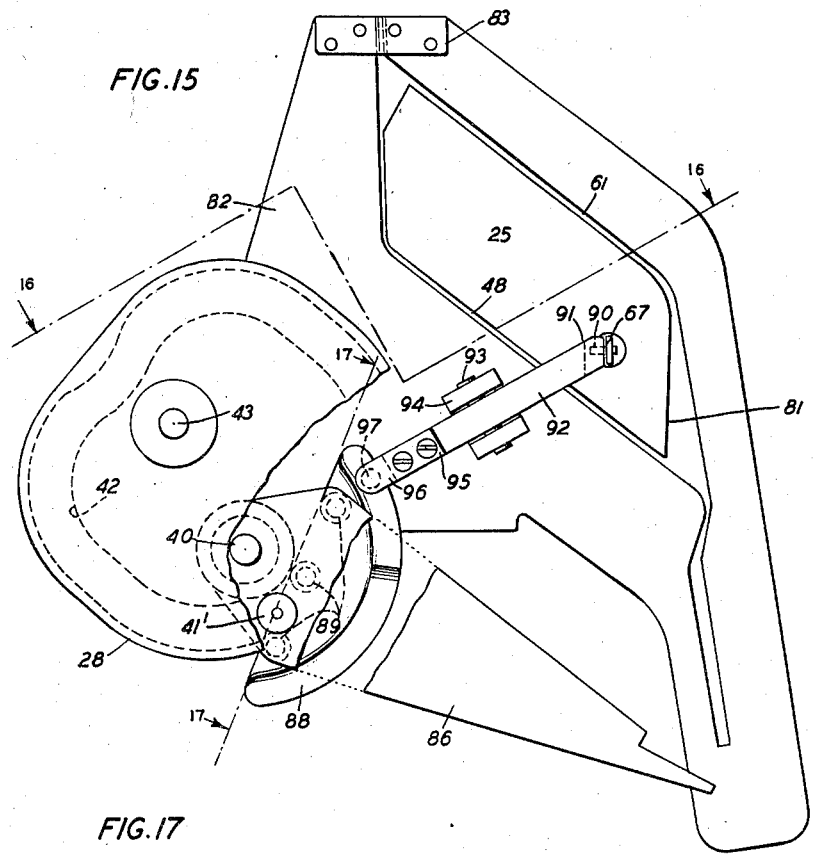
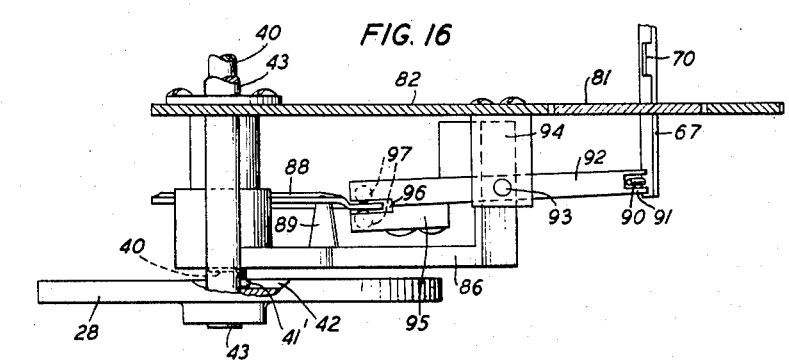
INVENTOR
G. E. ATKINS
BY
J. W. Schmied
ATTORNEY Patented Nov. 15, 1938

2,136,602

UNITED STATES PATENT OFFICE 2,136,602

TELETYPEWRITER PROJECTOR

George E. Atkins, Glen Ridge, N. J., assignor to Bell Telephone Laboratories, Incorporated, New York, N. Y., a corporation of New York Application August 22, 1936, Serial No. 97,369

12 Claims. (Cl. 88—28)

This invention relates to an exhibiting device and, more particularly, to means for projecting simultaneously material from more than one source upon a single screen.

It is an obejct of this invention to concurrently project material from more than one source upon a single screen by means of a single source of illumination.

It is another object of this invention to concurrently project more than one type of material upon a single screen by means of a single projector.

Still another object of the invention is to provide a teletypewriter projector with a plurality of display cards and means for intermittently superimposing them upon the teletypewriter stationery at the projection point.

A further object of the invention is to provide a teletypewriter projector with an improved storage device for storing a plurality of display cards.

Another object is to supply a teletypewriter projector with an improved escapement mechanism for releasing a plurality of display cards seriatim from their storage magazine.

An additional object is to furnish a teletypewriter projector with a plurality of display cards and an improved device for shifting the cards from their storage magazine to the projection point and back again.

These and other objects of the invention are attained by means of an improved projector. For purposes of explanation, this projector will be described with reference to its application to a news-advertising projector. However, it is to be understood that the invention is not to be limited to a news-advertising projector, but is capable of wide application. In the application of the invention to a news-advertising projector, the news is typed upon page stationery by a page teletypewriter. The typed page stationery is fixedly located at the projection point of the projector and the news, which constitutes the primary display material, is continuously projected onto the screen. Thus, it may be said that the primary display material is continuously located at the projection point.

The advertising material is printed on a pack of display cards mounted on trunnions and kept in a storage magazine. The cards, which constitute the secondary display material, are released one by one from the storage magazine, where they are normally located, by an escapement mechanism and are intermittently taken seriatim to the projection point via channeled guides by conveying means including a pair of reciprocating arms driven by an eccentric cam which is, in turn, driven by a motor. At the projection point, the cards are intermittently and momentarily superimposed across a portion of the face of the news material. A cam, operated by a lever, is provided on each side for pressing a superimposed card firmly in place over the news material so that the card will be in focus and will not vibrate.

These and other features of the invention will be found in the following detailed description of the invention with reference to the drawings in which:

Fig. 4 is a side view of the main parts of the invention;

Fig. 5 is a perspective view of a portion of one of the reciprocating arms;

Fig. 6 is a front view of the projection field of the projector showing the plate against which the display cards are held;

Fig. 7 is a top view of the projection field shown as a front view in Fig. 6;

Figure 12:
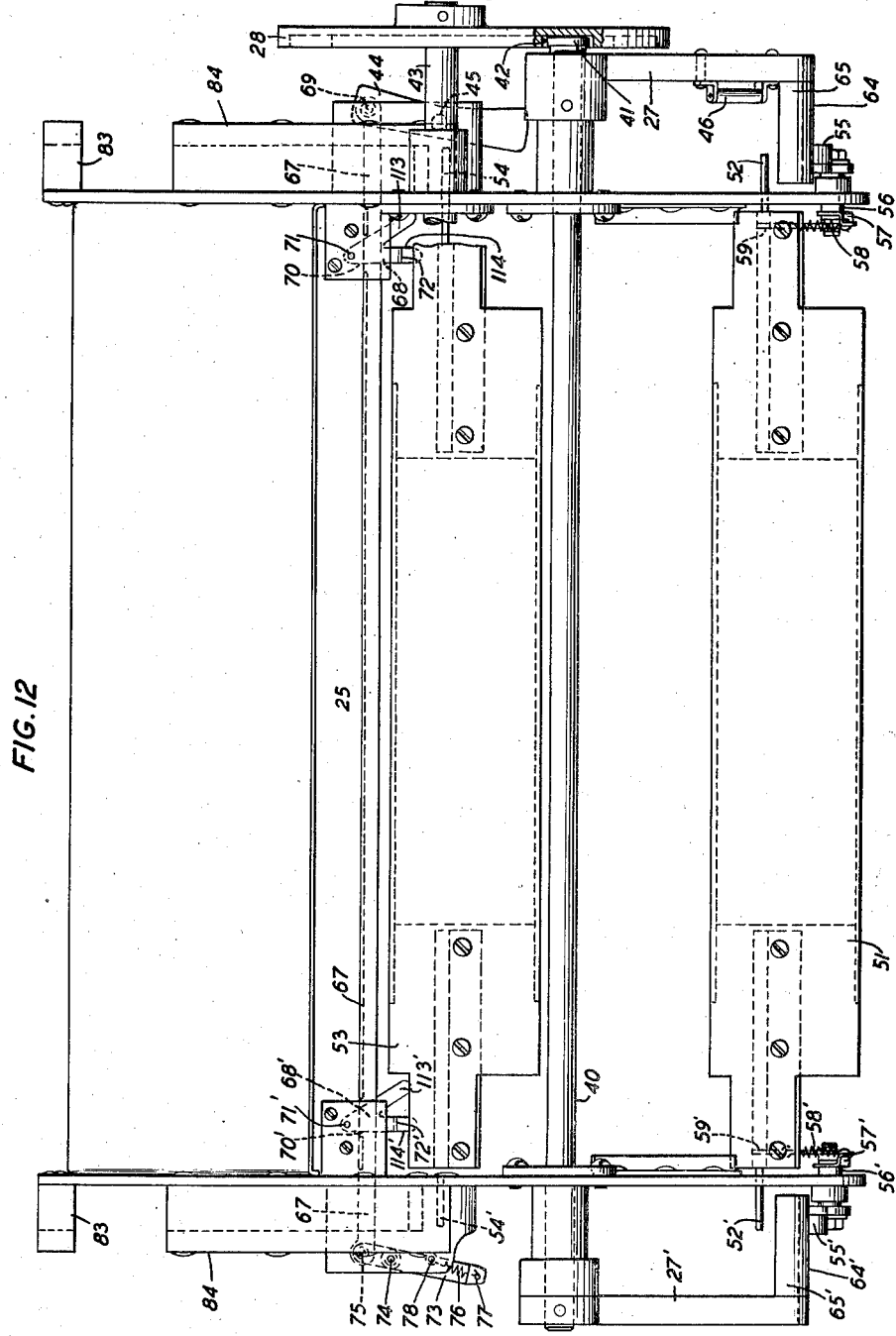

Figs. 8, 9, 10, and 11 show some of the positions assumed by the card-shifting mechanism during a cycle of its operation;

Fig. 12 is a rear view of the main parts of the storage magazine and the card-shifting mechanism;

Fig. 13 shows a card holder and the escapement mechanism in the release position;

Fig. 14 represents the position of the apparatus shown in Fig. 13 after the escapement mechanism has been operated to its hold position;

Fig. 15 is a side view of a modified form of the card-shifting mechanism; and

Figs. 16 and 17 represent portions of a modified arrangement for operating the escapement mechanism.

Figure 1:
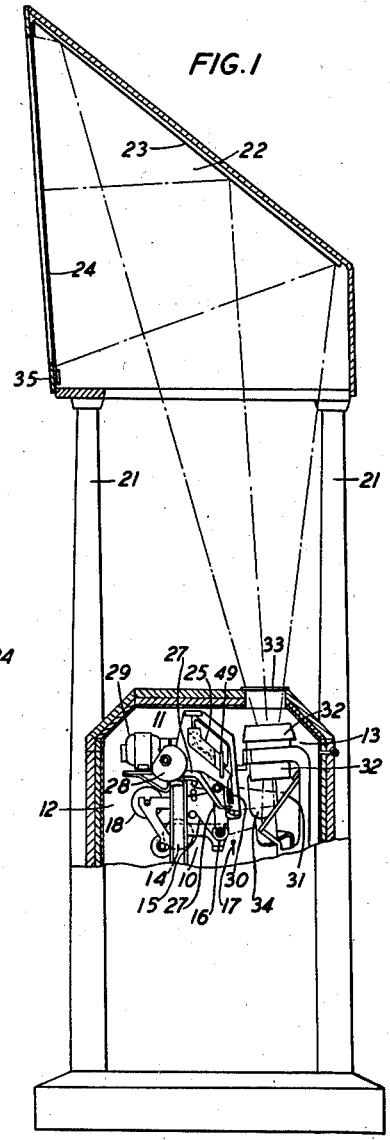
Fig. 1 is a side view of the projector as a whole with part of its side broken away to show various parts of the projecting and card shifting mechanism.

Referring now to Fig. 1 of the drawings, this figure discloses a side view of the news-advertising projector as a whole and shows only such portions of the teletypewriter mechanism, the advertising-card shifting mechanism, and the optical system as are necessary to illustrate the general functioning of the entire projector.

For a full understanding of the operation of a complete news projector, to which the features of this invention may be applied, reference may be had to Patent 2,046,697, issued to Harry Pfannenstiehl on July 7, 1936, disclosing a projecting device, and also to Patent 1,904,164, issued on April 18, 1933 to S. Morton et al., which discloses a teletypewriter of the page printer type which is suitable for the purposes of this invention.

The projector, as shown in Fig. 1, comprises a general structure having a lower compartment 12 and an upper compartment 22, the latter supported directly above the former by means of four posts 21. The lower compartment 12 contains the teletypewriter 10, the advertising card storage magazine and shifting mechanism 11, and the optical system 13. The upper compartment 22, which is open at the bottom, contains a large mirror 23 and the screen 24, which comprises the display area, of translucent material upon which is displayed the image of the teletypewriter page as well as the image of the advertising material whenever the latter is superimposed over a portion of the teletypewriter page.

The teletypewriter, or printer 10, is of a type particularly suited for the present purpose in that it is so constructed that characters are visible right after they are printed thereby permitting the optical system 13 to observe the actual printing as readily as a typist can in the operation of an ordinary typewriter. The printer 10 carries a supply roller 14 of standard opaque paper 15 of sufficient width for page printing. The paper strip 15 is led about a platen 16 and passes behind the color ribbon (not shown) at the line of printing in the usual manner. Bar 17 represents one of the type hammers of the printer 10 in the printing position. After being printed upon, paper 15 passes through the projection field at the projection point of the projector, and is then wound on the return, or take-up roller 18. The driving motor for the teletypewriter 10 and the means by which motion is imparted to the rollers 14 and 18 has not been shown in this figure for the sake of simplicity.

The advertising card storing and shifting mechanism 11 comprises a card storage magazine 25, an escapement mechanism 49, and a pair of reciprocating arms one of which, arm 27, is shown in this figure. The arms 27 are actuated by an eccentric cam 28 which in turn is driven by an independent motor 29. The downward motion of the reciprocating arms 27 causes the escapement mechanism 49 to function and release an advertising card from the magazine 25. Upon the continued down-stroke of the arms 27 this released card is conveyed to the projection field of the projector at the projection point 30, the card being superimposed across a portion of the printed page 15.

After an interval determined by the speed of motor 29 and cam 28, the reciprocating arms 27 move upward and return the advertising card from the projection point 30 to storage magazine 25. Upon the subsequent down-stroke of arms 27 another card is released from the magazine 25 and brought down into the projection field at the projection point 30. As long as motor 29 keeps running, this cycle of operations continues, all of the cards in magazine 25 being displayed seriatim in continued rotation. The cam 28 and arms 27—27' and their associated apparatus thus comprise control means for controlling the projection of this secondary display material onto the display area, screen 24. The various mechanisms employed in card shifting and storage are fully illustrated in Figs. 4 to 17, inclusive, and a detailed description of their operation will be set forth hereinafter.

The optical system of the projector comprises a viewing mirror 31, or other reflector, placed opposite the projection field at a 45 degree angle to this field, so that an inverted image of the field is reflected upward through the objective lens system 32 and through the glass lid 33 and is indicated in Fig. 1 by the dot-dash lines. This image is received by the large mirror 23 in the upper compartment 22. Mirror 23 is placed at a 45 degree angle with respect to the axis of the objective system 32 thus causing the image to be again inverted and projected, greatly enlarged, upon the translucent screen 24. Lamp 34, in the lower compartment 12, represents one of several lamps used as a light source for the optical system. For a detailed description of this optical system, reference may be had to the aforementioned Patent 2,046,697, issued to Harry Pfannenstiehl.

Figure 2:
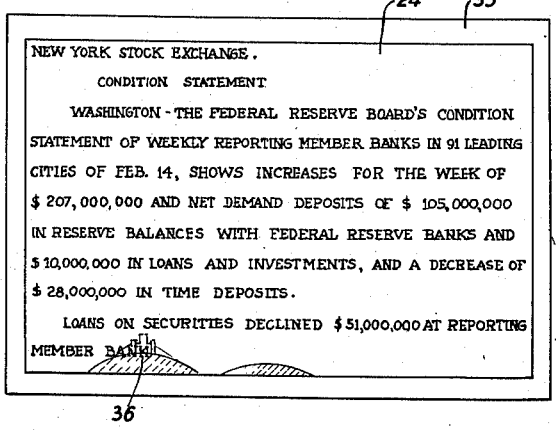
Fig. 2 illustrates the screen of the projector with news material projected thereon.
Figure 3:
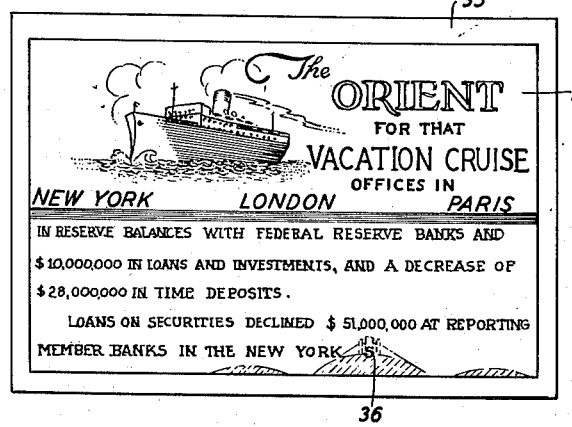
Fig. 3 represents the screen when an advertising card, superimposed over the top portion of the news material, is projected thereon.

Figs. 2 and 3 are front views of the projector screen 24 enclosed by the frame 35. Fig. 2 illustrates a projected printed item, such as a news-item, as it appears on the screen 24 during those intervals when no advertising card is in the projection field of the projector. Fig. 3 shows the same projected news-item as is illustrated in Fig. 2 but at a short interval of time later, the card-shifting mechanism 11 of the projector having functioned in the meantime and released and conveyed an advertising card to the projection point 30 of the projector, superimposing this card over the upper half of the printed page 15. The color ribbon and guide 36 is visible, as shown in both Figs. 2 and 3, thus permitting the actual printing operations to be observed on the screen 24.

Referring now to Fig. 4, there is shown therein a side view of the main parts of the invention, disclosing in detail the card storing and shifting mechanism 11 together with such portions of the teletypewriter 10 as are required for a clear understanding of the manner in which the invention functions. The standard opaque paper strip 15 for the printer 10 is carried on the supply roll 14 and is led from here over a paper tension roller 9 and around the platen 16 to the printing point. At this point the paper passes behind the color ribbon (not shown) at the line of printing for being typed upon by the type hammers 17.

The paper strip 15 continues through the projection field of the projector (indicated between the dotted lines D, D) of the projector, riding in the guide channel of plate 79 which is located in the projection field in the space between platen 16 and roller 7 as shown in detail in Figs. 6 and 7. The paper is then led over the guide rolls 7 and 8, between the tension rolls 37 and 38, and is finally wound on the paper return, or take-up, roll 18. The motive power for this paper feed mechanism is indicated by driven pulley 1, the motion of which is imparted to the aforementioned paper and guide rolls by pulley 2 and belts 3, 4, and 5.

The advertising card storing and shifting mechanism 11 is mounted on the frame 39 directly above the printer proper. Arm 27 is fastened to a shaft 40 which extends to the opposite side of the device at which point a second arm (arm 27' shown in Fig. 12), similar to arm 27 is fastened to shaft 40. A trunnion, or roller bearing, 41 is attached to arm 27 and is fitted into a groove, or channel, 42 cut into the eccentric cam 28. Cam 28 revolves on shaft 43 under power transmitted to this shaft by motor 29 through a set of reduction gears (not shown). As the eccentric cam 28 revolves it imparts an up and down reciprocating motion to the arm 27 as well as to the similar arm 27' which is fastened to the opposite end of shaft 40.

In the preferred embodiment of the invention as shown herein, the advertising matter to be displayed is, to facilitate its interchangeability, printed, painted, or stamped on cards of any suitable material which are then mounted on card holders, such as the holders 51 and 53 shown in detail in Fig. 12. It should be understood, however, that the advertising matter may be placed directly on the card holder without the medium of a card in which case the card holder becomes the advertising card itself. The card holders are provided with a trunnion at each end, these trunnions riding in the channeled guide 48 and the corresponding guide on the opposite side of the device. Card holder 51, as shown in Fig. 12, illustrates the manner in which its trunnions 52 and 52' are mounted thereon.

The storing means, or storage magazine, 25 and the channeled guides in which the card holder trunnions ride are formed by the side plates 81 and 82, the connecting members 83 and 84, and the corresponding oppositely located side plates and connecting members on the other side of the device. The floating side plate 81 is held in the proper position with respect to plate 82 by the connecting member 84 thereby forming the lower channel 48 and the upper channel 61. The inside face of member 84 is slotted, as indicated at 80, in line with the lower channel 48 to accommodate the full length of the card holder trunnions. Means for inserting and removing card holders from the magazine 25 is provided by slotting the upper end of side plate 82 to form channel 85. The connecting member 83 holds the upper ends of plate 82 in the proper position. The inside face of member 83 is slotted in line with channel 85, to accommodate the full length of the card holder trunnions, thereby permitting card holders to be slipped in or out of the magazine 25 through channel 85 and the corresponding channel on the other side of the device.

The card holders or cards are held in magazine 25 by an escapement mechanism 49 one of which is bent to form a cup 65 as illustrated in 
Fig. 5. A similar projecting member (member 64' shown in Fig. 12) is attached to the free end of the oppositely located reciprocating arm 27' on the other side of the device. The function of member 64 is to provide a seat for one of the card holder trunnions, such as trunnion 52 of card holder 51, during part of the down-stroke of arm 27 as well as during the entire up-stroke of arm 27. In addition, the cupped end 65 of member 64 acts as a stop guide during the up-stroke of arm 27 and prevents the card-holder trunnion 52 from improperly entering the lower portion of channeled guide 48 on passing the point 66 when it is being conveyed from the projection point 30 back to the storage magazine 25. This latter function of member 64 is more clearly illustrated in Fig. 8, a description of which will be set forth hereinafter.

When the card-holder 51 is released from the magazine 25, it drops by gravity to point 50 where its trunnions 52 and 52' rest on members 64 and 64' (the latter shown in Fig. 12) of the downward moving arms 27 and 27' (the latter also shown in Fig. 12). The continued downward motion of arm 27 and the corresponding arm 27' on the opposite side of the magazine 25 conveys the released advertising card holder 51 from point 50 into the upper portion of the projection field (the field between the points indicated by the dotted lines D, D) of the projector and then to the projection point 30. Here the card holder 51 is superimposed across the upper portion of the printed page 15. The card holder 51 is prevented from dropping any lower into the projection field D, D by its trunnion 52 resting on the bottom of the slot of the channeled guide 48.

As the arm 27 continues to travel a short distance further toward the end of its downward stroke, the projecting member 64 presses against control lever 55 and causes the shaft 56, to which this lever 55 is attached, to move in a counter-clockwise direction. This movement of shaft 56 causes the lug 57 which is attached to the other end of shaft 56 to move in a downward direction and exert a downward pull on spring 58. The pull exerted on spring 58 is stronger than the pull exerted by spring 60 and causes cam 59 to contact the card holder 51 and to press it firmly in place against plate 79. Thus, when the control lever 55 moves cam 59 from its normally unoperated position to its operated position, cam 59 holds the card holder 51 from vibrating and moving out of focus during the case-shift and line-shift operations of the printer 10. A similar holding means for preventing jiggling, vibrating, and moving of a card holder is located at the other side of the projection field D, D. This second holding means includes a lever, spring, and cam assembly similar to that just described and serves to hold the other side of the advertising card holder 51 firmly in place during the projection of its card. This second cam assembly is actuated by the oppositely located arm 27', corresponding to arm 27, in a manner identical with that just set forth above.

When an advertising card holder 51 is at the projection point 30 of the projector and is held rigidly against plate 79 by cams 59, it is necessary to keep the card holder 51 from contacting with the paper strip 15 in order to permit free movement of paper strip 15 during the line-shift and case-shift operations of printer 10. To this end, plate 79 is provided with a paper channel 111 recessed to a depth slightly greater than the thickness of the paper strip 15 as is illustrated in detail in Figs. 6 and 7. In the front view of plate 79, shown in Fig. 6, the paper strip 15 may be seen in the recessed paper channel 111 of plate 79. The left and right portions of plate 79 are in a plane slightly in front and ahead of the plane of the surface of the paper strip 15 and it is on these left and right portions of plate 79 that the card holder 51 is pressed when being held by cams 59 and 59' in the projection, or display, position. Fig. 7, which is an edgewise view of plate 79, shows a card holder 51 superimposed across the face of the paper strip 15 and held against plate 79 by the cams 59 and 59', the paper strip 15 being free to move behind the card holder 51 in the recessed channel 111 of plate 79.

After an interval of time determined by the speed of motor 29, the cam 28 causes the arm 27 and the corresponding oppositely located arm 27' to move upward. When projecting member 64 of arm 27 leaves lever 55, this lever 55 returns to its initial position allowing lug 57 to do the same. Spring 60 thereupon pulls cam 59 back to its initial unoperated position thus removing the pressure from the card holder 51. At the same time, the oppositely located card pressure assembly similarly returns to its initial position. As the arm 27 now moves upward, it picks the card holder 51 up by its trunnion 52 and the oppositely located arm (arm 27' in Fig. 12) picks up the other end of the card holder 51 by the trunnion 52' on that side.

The arms 27 and 27' convey the card holder 51 to the top of magazine 25, the trunnions 52 and 52' of the card holder 51 being carried by arms 27 and 27' and following the upper channeled guide 61. When the card holder 51 reaches the point 62, it drops from arms 27 and 27', falls into the lower channeled guide 48, and returns by gravity to the lower part of the storage magazine 25. When arm 27 passes the lever 44 during its up-stroke, the roller 46 rides over lever 44 and causes it to move and actuate the escapement mechanism 49 in a manner to be described hereinafter. The escapement mechanism 49 positions the next card holder 53 in the magazine 25 for its proper release upon the subsequent down-stroke of arm 27. The detailed functioning of the escapement mechanism 49 will be fully described hereinafter.

For a clearer understanding of the functioning of the reciprocating arms 27 and 27' during the card-shifting operations, reference may be had to Figs. 8 to 11, inclusive, which show various positions of the arm 27 and of the eccentric driving cam 28 at different stages of the shifting operations.

Figure 8:
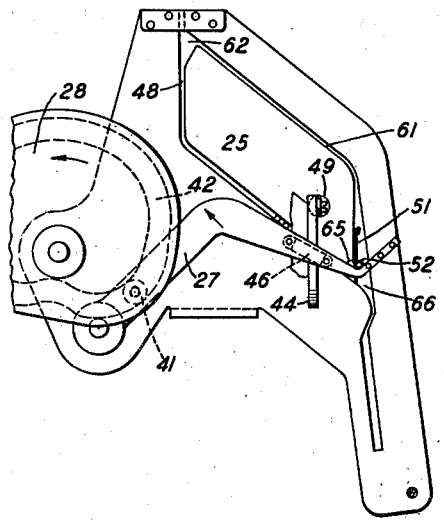

In Fig. 8, the arm 27 is shown in the midst of its up-stroke. This arm 27, together with the oppositely located arm 27' (not shown here), is carrying the previously displayed card holder 51 by the trunnion 52. Roller, or cam 46 on arm 27 has contacted lever 44 and is about to move that lever (in a manner which will be described in detail hereinafter) for the purpose of actuating the escapement mechanism 49. From the position of arm 27 in this figure it may be noted that the cupped end 65 of member 64 of this arm acts as a stop guide for trunnion 52 when this trunnion 52 passes point 66 thereby preventing the trunnion 52 from improperly entering and riding in the lower portion of the channeled guide 48.

Figure 9:
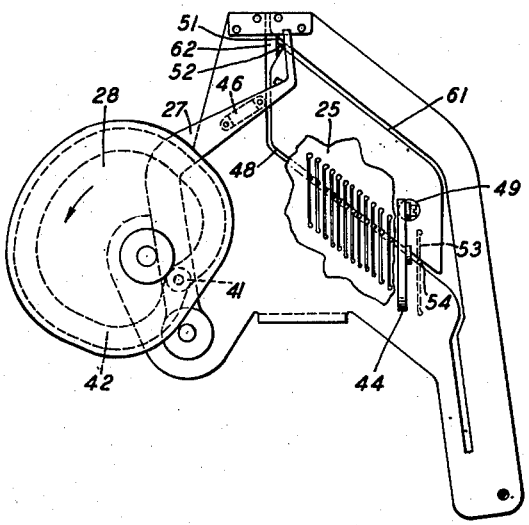

In Fig. 9, the arm 27 is shown at the highest point of its up-stroke, the card holder 51 having been carried to point 62 by its trunnion 52 riding in the upper channeled guide 61. From point 62, the card holder 51 drops down through the upper portion of the channeled guide 61 into the card storage magazine 25 by gravity, trunnion 52 riding in the upper portion of the channeled guide 48. When roller 46 passed across the upper portion of lever 44, it caused this lever 44 to move and actuated the escapement mechanism 49 in a manner which will be set forth in detail hereinafter. Fig. 9 also shows the apparatus in the condition where the escapement mechanism 49 functioned and moved the next card holder in the magazine, card holder 53, forward and is holding this card holder 53 in the position shown in dotted lines in Fig. 9 from which point it will be released upon the subsequent down-stroke of arm 27.

Figure 10:
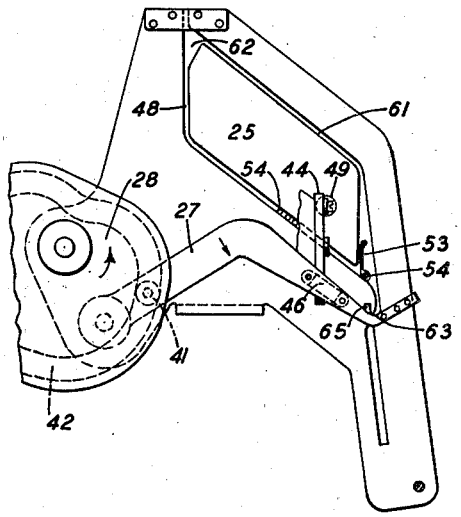

Fig. 10 shows arm 27 during its subsequent down-stroke just previously referred to. Roller 46 is contacting lever 44 and has moved this lever 44 which in turn has actuated the escapement mechanism 49. This mechanism 49 shifts from its hold to its release position, as will be fully explained hereinafter, and releases the card holder 53 which drops by gravity until its trunnion 54 rests on member 64 of arm 27 at point 63. The card holder 53 is then conveyed to the projection point 30 of the projector by the continued downward motion of arm 27 and of the corresponding arm 27' (not shown) on the opposite side of the device.

Figure 11:
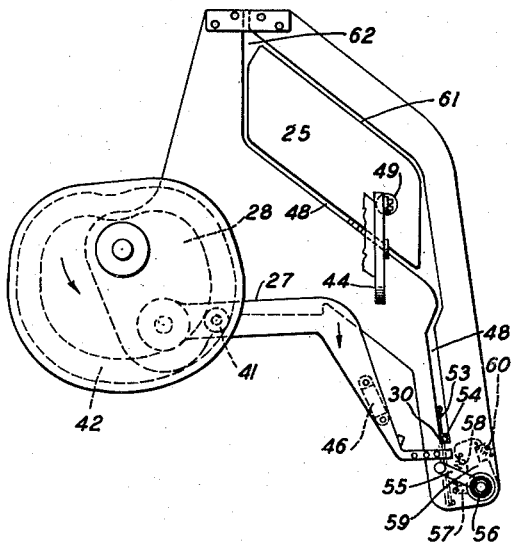

In Fig. 11, the arm 27 is shown near the termination of its down-stroke. The card holder 53 is now at the projection point 30 of the projector, its downward movement having been stopped when trunnion 54 reached the bottom of guide 48. The arm 27 as pictured in this figure has still a short distance to travel downward after which its projecting member 64 depresses lever 55. Downward movement of lever 55 will cause cam 59 to press the card holder 53 firmly into place against the outer edges of plate 79 in the manner described above in connection with the description of the operation of the apparatus shown in Fig. 4.

Referring now to Fig. 12, there is disclosed a rear view of part of the invention showing the entire card-shifting mechanism located on both sides of the storage magazine 25. The driving motor 29, the associated reduction gears, and a portion of drive shaft 43 have been deleted from this figure for clarity. The card-shifting arms 27 and 27' are connected to opposite ends of shaft 40 which extends beyond the ends of magazine 25. Arm 27 is coupled to cam 28 by means of a trunnion, or roller bearing 41 which is attached to the arm 27 and which rides in the channel, or guide, 42 cut into the face of cam 28. In rotating, cam 28 imparts an up and down reciprocating motion to arm 27 and also, through the medium of the common connecting shaft 40, to arm 27'. Arms 27 and 27' are similar, as previously noted, but arm 27' is not equipped with a camming means, or roller, 46 because the escapement control lever 44, which is actuated by roller 46, has no oppositely located counterpart.

The card holder escapement mechanism is shown in its release position in Fig. 12. It comprises a cam, or control lever, 44, a rod 67 attached thereto at the pivot 69, and a pair of bifurcated fingers, or members, 68 and 68' mounted on pivots 71 and 71' at opposite ends of storage magazine 25. Rod 67 is slotted at the points 70 and 70' and the members 68 and 68' are fitted into these slots in such a manner that the horizontal movement of rod 67, under the control of lever 44, causes the members 68 and 68' to shift on their pivots 71 and 71' from right to left or vice versa so that either the right or the left fingers of these members 68 and 68' are in the vertical position and in contact with a card holder, such as the holder 53.

One of the fingers, or prongs, of each of the bifurcated members 68 and 68' (the left fingers 114 and 114' as shown in the rear view in Fig. 12) is bent at point 72 (or 72') in such a manner that its end is set back with respect to the end of the unbent finger 113 or 113' associated with it so that the two prongs lie in two different planes. This construction can be better understood by considering the left fingers 114 and 114' as being bent forward from the plane of Fig. 12. In this release position of the escapement mechanism, the bent or left finger 114 or 114' of each of the bifurcated members 68 and 68' passes straight down in front of the card holder of the next advertising card to be displayed. This prevents the card holder, such as the card holder 53, from dropping into the lower channeled guide 48 leading to the projection point 30. The reason for thus holding back card holder 53 is that the previously released card holder 51 has just been conveyed to the projection point 30 by the downward movement of arms 27 and 27'.

As is shown in Fig. 12, the reciprocating arms 27 and 27' are now at the bottom of their downstroke and their projecting members 64 and 64' have depressed levers 55 and 55'. These levers 55 and 55' have caused cams 59 and 59' to press card holder 51 against the plate 79 (shown in Figs. 4, 6, and 7) in the manner described above thus preventing any vibration of the card holder 51 and thereby maintaining the advertising card in proper focus during the time that it is being projected.

Lever 73 is pivotally connected to the rod 67 by pivot 75 and is also pivotally connected to the stationary connecting member 84 by pivot 74. Fastened to lever 73 at point 77 is one end of a spring 76 the other end of which is fastened at point 78 to the stationary member 84. The function of lever 73 and spring 76 is to assist in the positioning of rod 67 and the bifurcated members 68 and 68'. Lever 73 and spring 76 also serve as an off-center holding device for rod 67 and fingers 68—68' to prevent them from "floating" once they have been positioned by the operation of the escapement control lever 44 during the passage of roller 46 of arm 27 over lever 44.

As rod 67 moves from left to right, or vice versa, under control of the movement of lever 44, lever 73 moves on its pivot 74 with a motion corresponding to that of lever 44. When lever 73 advances past its center, or vertical, position, the tensile force of spring 76 pushes lever 73, rod 67, and lever 44 completely to the right or left position as the case may be. This serves to hold rod 67, fingers 68 and 68', and levers 73 and 44 in that position until the subsequent up or downstroke of arm 27 causes roller 46 to move lever 44 to the opposite position.

Referring now to Fig. 13, there is illustrated therein a front view of the card holder escapement mechanism in its release position illustrating in detail the position of the various parts of this mechanism during the release of a card holder from the storage magazine 25 on the downward stroke of the reciprocating arms 27 and 27'. Only that portion of arm 27 to which the roller 46 is attached is shown since the card holder conveying function of this arm 27 and the oppositely located arm 27' has been fully illustrated and described hereinbefore.

When roller 46 of arm 27 contacts the lower side of lever 44 (as illustrated by the dotted lines), it moves lever 44 on its pivot 45 to its full-line position thereby pulling rod 67 to the left. Lever 73 moves in unison with lever 44 and, as it passes its center position, the action of spring 76 causes lever 73, rod 67, the bifurcated members 68 and 68', and lever 44 to assume the positions shown here. Up to this point, card holder 51 was held in the storage magazine 25 by the straight fingers 113 and 113' (shown here at the left) which were then in their vertical position and hanging down in front of the card holder 51 to prevent it from sliding out of magazine 25.

As members 68 and 68' now move clockwise on their pivots 71 and 71', the left fingers 113 and 113' move clockwise in an arc from their position in front of card holder 51 to a higher position at the left thereby freeing card holder 51. Card holder 51 is now free to drop by gravity into the lower channeled guide 48 and to be conveyed to the projection point 30 by arms 27 and 27' as previously described. The right fingers 114 and 114', which are bent so that they lie in a plane in back of the left fingers 113 and 113', move clockwise in an arc downward until they are practically in a vertical position (as shown in Fig. 13). In so moving, fingers 114 and 114' pass behind the released card holder 51 and in front of the succeeding card holder 53 to prevent card holder 53 from leaving the storage magazine 25 at this time.

Fig. 14 shows the escapement mechanism in its hold position during the up-stroke of arm 27 and holding card holder 53 which will be released for projection upon the subsequent downstroke of arm 27. For clarity of illustration, the card holder 51 which has just previously been displayed and is now being returned to the storage magazine 25 by the upward movement of the arms 27 and 27' is not shown, this phase of the card-shifting operation having previously been described in detail.

As roller 46 of arm 27 contacts the upper side of lever 44 (as indicated by the dotted lines in Fig. 14), it moves lever 44 to its full-line position thereby pushing rod 67 to the right. Lever 73 moves in unison with lever 44 and, as it passes its vertical center position, the action of spring 76 causes lever 73, rod 67, the members 68 and 68', and lever 44 to assume the positions shown here. During the movement of rod 67, the members 68 and 68' move counter-clockwise on their pivots 71 and 71' and cause the bent fingers 114 and 114' to move upward from in front of the card holder 53. This allows the card holder 53 to drop forward slightly by gravity, and to come to rest against the straight fingers 113 and 113' which have now moved downward so that they are in a vertical position. The card holder 53 will now be held behind fingers 113 and 113' until the next down-stroke of arm 27 shifts the escapement mechanism to its release position. This procedure will be repeated until the driving power is shut off.

A modified arrangement for actuating the card holder escapement mechanism of this invention is disclosed in Figs. 15, 16, and 17. The difference between this modification and the preferred arrangement described above lies in the manner in which motion is imparted to rod 67 and its associated bifurcated members 68 and 68' in effecting the release of a card holder from the storage magazine 25 of the device.

Fig. 15 shows a side view of the modified arrangement and corresponds, with respect to the relative location of the various parts of the invention, to the view shown in Fig. 4 of the preferred arrangement for actuating the card-shifting mechanism. Two arms, arm 86 and a corresponding oppositely located arm (not shown), are fastened to the opposite ends of shaft 40, these arms corresponding functionally to the previously illustrated and described arms 27 and 27'. Arm 86 is provided with a roller bearing 41' which is identical with roller bearing 41 of arm 27 as shown in Figs. 4 and 8 to 11, inclusive. This bearing 41' rides in the channel 42 of the eccentric cam 28 with the result that the rotation of cam 28 imparts an up and down reciprocating motion to arm 86 and, through the medium of shaft 40, to the oppositely located arm (not shown). These arms convey the card holders seriatim to the projection field of the projector and return them to the storage magazine 25 in a manner identical with that described above for arms 27 and 27' and no further description of this card conveying phase need be given.

Referring now to Fig. 16, which is a cross-sectional view of Fig. 15 taken on the line 16—16, the manner in which the card holder escapement mechanism is actuated during the reciprocating motion of arm 86, will now be described. A semicircular cam 88 is fastened to the inside of arm 86 by studs 89. The card holder escapement rod 67, which positions the bifurcated members 68 and 68' (not shown in these figures) in the manner already fully described above, is provided at one end with a pin 90 which is fitted into the slotted end 91 of lever 92. Lever 92 is pivoted on pivot 93 attached to the projecting member 94 fastened to the side plate 82. The other end of lever 92, as well as one end of member 95 attached thereto, is cut out to form a slot 96. A roller bearing 97 is provided in each inside face of slot 96, and the outer faces of cam 88 ride in slot 96 between these roller-bearings 97.

The outer edge of cam 88 is cut so that the upper and lower portions of this edge (in respect to the position of the cam 88 as shown in Fig. 15) are in different planes with respect to each other as well as with respect to the inner portion of the body of cam 88. Fig. 17 discloses an end view of cam 88 taken along the line 17—17 of Fig. 15 and illustrates the relative position of these outer faces of cam 88 with respect to its straight central portion 99 which is fastened to arm 86 by the studs 89.

Since the roller bearings 97 in slot 96 of lever 92 ride over the outer faces of cam 88, the bent surface of the cam edge causes lever 92 to move on its pivot 93 during the up and down strokes of arm 86. This movement of lever 92 is communicated to the rod 67 through the medium of slot 91 and pin 90. Rod 67 in turn controls the positioning of the bifurcated members 68 and 68' (shown in Figs. 12, 13, and 14) so that the card holders are held and released in a manner similar to that described above in connection with the description of the operation of the invention using the preferred form of control for actuating the escapement mechanism. It is to be understood that other modifications of the invention may be made without departing from the principles and features of operation of the invention which are to be limited only by the claims appended hereto.

What is claimed is:

1. An exhibiting device including in combination a display area, a projection point, projecting means including a mirror for projecting onto the display area an image of display material located at the projection point, illuminating means interposed between the mirror and the projection point for illuminating display material located at the projection point and for conditioning said display material for projection onto the display area, primary display material continuously located at the projection point for illumination by the illuminating means and for projection onto the display area by the projecting means, secondary display material normally located away from the projection point, and conveying means for intermittently and alternately carrying the secondary display material toward and from the projection point for momentary illumination by the illuminating means and for momentary projection onto the display area by the projecting means, said conveying means including an arm for actually conveying the secondary display material, an eccentric cam for imparting a reciprocating motion to the arm, and a motor for rotating the cam.

2. An exhibiting device including in combination a display area, a projection point, projecting means including a mirror for projecting onto the display area an image of display material located at the projection point, illuminating means interposed between the mirror and the projection point for illuminating display material located at the projection point and for conditioning said display material for projection onto the display area, primary display material continuously located at the projection joint for illumination by the illuminating means and for projection onto the display area by the projecting means, secondary display material normally located away from the projection point, and conveying means for intermittently and alternately carrying the secondary display material toward and from the projection point for momentary illumination by the illuminating means and for momentary projection onto the display area by the projecting means, said conveying means comprising an eccentric cam having a groove in one of its sides, a motor for rotating the cam, an arm for actually conveying the secondary display material, and a trunnion having one end attached to the arm and another end fitted into the groove in the cam for transmitting the motion of the cam to the arm for conveying the secondary display material.

3. An exhibiting device including in combination a display area, a projection point, projecting means including a mirror for projecting onto the display area an image of display material located at the projection point, illuminating means interposed between the mirror and the projection point for illuminating display material located at the projection point and for conditioning said display material for projection onto the display area, primary display material continuously located at the projection point for illumination by the illuminating means and for projection onto the display area by the projecting means, secondary display material comprising a plurality of display cards, a storage magazine for storing the display cards, an escapement device for releasing the cards one at a time from the storage magazine, and an arm for intermittently and alternately conveying the cards seriatim from the storage magazine toward and from a superimposed position across the face of the primary display material at the projection point, said escapement device comprising a pivotally mounted bifurcated finger having one of its prongs spaced in advance of the other relative to the plane of a card in the storage magazine, said bifurcated finger having a hold position for enabling one of the prongs to hold back all the cards in the storage magazine and a release position for enabling the other prong to hold back all but one of the cards in the storage magazine, and an instrumentality for shifting the finger from one position to the other for effecting the release of a card for conveyance by the arm to the projection point for momentary illumination by the illuminating means and for momentary projection onto the display area by the projecting means.

4. An exhibiting device including in combination a display area, a projection point, projecting means including a mirror for projecting onto the display area an image of display material located at the projection point, illuminating means interposed between the mirror and the projection point for illuminating display material located at the projection point and for conditioning said display material for projection onto the display area primary display material continuously located at the projection point for illumination by the illuminating means and for projection on to the display area by the projecting means, secondary display material comprising a plurality of display cards, a storage magazine for storing the display cards, an escapement device for releasing the cards one at a time from the storage magazine, and a reciprocating arm for intermittently and alternately conveying the cards seriatim from the storage magazine toward and from a superimposed position across the face of the primary display material at the projection point, driving means for driving the reciprocating arm, said escapement device comprising a pivotally mounted bifurcated finger having a hold position and a release position for releasing the cards one by one to the reciprocating arm for conveyance to the projection point for momentary illumination by the illuminating means and for momentary projection onto the display area by the projecting means, and a camming means mounted on said conveying arm for shifting the finger from one position to the other during the ricprocating movement of the arm.

5. An exhibiting device including in combination a display area, a projection point, projecting means for projecting onto the display area an image of display material located at the projection point, primary display material continuously located at the projection point for projection onto the display area by the projecting means, secondary display material comprising a plurality of display cards, storing means for storing the cards, conveying means for conveying the cards seriatim from the storing means to a superimposed position across the face of the primary display material for projection onto the display area by the projecting means, and instrumentalities for bringing a superimposed card into focus for projection by the projecting means and for preventing it from jiggling during the period of its projection, said instrumentalities including a cam for compressing a portion of a superimposed card against the primary display material at the projection point to form anti-jiggling holding means.

6. An exhibiting device including in combination a display area, a projection point, projecting means for projecting onto the display area an image of display material located at the projection point, primary display material continuously located at the projection point for projection onto the display area by the projecting means, secondary display material comprising a plurality of display cards, a storage magazine for storing the cards, conveying means for conveying the cards seriatim from the storage magazine to a superimposed position across the face of the primary display material for projection onto the display area by the projecting means, and instrumentalities for bringing a superimposed card into focus for projection by the projecting means and for preventing it from vibrating during the period of its projection, said instrumentalities comprising a plurality of cams for compressing portions of a superimposed card firmly against the primary display material at the projection point to form anti-vibrating holding means.

7. An exhibiting device including in combination a display area, a projection point, projecting means for projecting onto the display area an image of display material located at the projection point, primary display material continuously located at the projection point for projection onto the display area by the projecting means, secondary display material comprising a plurality of cards, a storage magazine for storing the cards, a reciprocating arm for intermittently conveying the cards seriatim from the storage magazine to a superimposed position across the face of the primary display material for projection onto the display area by the projecting means, driving means for driving the reciprocating arm, and instrumentalities for bringing a superimposed card into focus for projection by the projecting means and for preventing it from moving while being projected, said instrumentalities comprising a cam device for pressing a superimposed card firmly against the primary display material at the projection point to form anti-jiggling holding means, said cam device having an operated position and an unoperated position, and a control lever operable by the conveying arm for shifting the cam device from one of its positions to the other during the reciprocating movement of the arm.

8. An image projecting and display device having a single display screen for displaying in combination thereon images of two different types of display material one of which is displayed continuously and the other at regular intervals, said image projecting and display device comprising a projection point for supporting both types of display material in position for projection thereof, illuminating means for illuminating the projection point and the display material thereat, an optical system for projecting an image of the display material at the projection point on to the single display screen, primary display material, supporting means for supporting said primary display material in said image projecting and display device, means for maintaining some of said primary display material constantly at the projection point during the period of operation of the image projecting and display device for projection thereof by said optical system, secondary display material comprising a plurality of movable display slides, holding means for holding said display slides in the image projecting and display device in a location away from the projection point, and conveying means for intermittently and alternately carrying the movable display slides toward and from the projection point at regular intervals for momentary illumination by said illuminating means and for momentary projection of their images by said optical system on to the display screen in combination with the image of the primary display material.

9. An image projecting and display device having a single display screen for displaying in combination thereon images of two different types of display material one of which is displayed continuously and the other at regular intervals, said image projecting and display device comprising a projection point for supporting both types of display material in position for projection thereof, illuminating means for illuminating the projection point and the display material thereat, an optical system for projecting an image of the display material at the projection point on to the single display screen, primary display material, supporting means for supporting said primary display material in said image projecting and display device, means for maintaining some of said primary display material constantly at the projection point during the period of operation of the image projecting and display device for projection thereof by said optical system, secondary display material comprising a plurality of movable display slides, holding means for holding said display slides in the image projecting and display device in a location away from the projection point, and conveying means for intermittently and alternately carrying the movable display slides toward and from the projection point at regular intervals for momentary superimposition over a portion of said primary display material at the projection point at regular intervals for momentary illumination by said illuminating means and for momentary projection of their images by said optical system on to the display screen in combination with the image of the primary display material.

10. An image projecting and display device having a single display screen for displaying in combination thereon images of two different types of display material one of which is displayed continuously and the other at regular intervals, said image projecting and display device comprising a projection point for supporting both types of display material in position for projection thereof, illuminating means for illuminating the projection point and the display material thereat, an optical system for projecting an image of the display material at the projection point on to the single display screen, primary display material, supporting means for supporting said primary display material in said image projecting and display device, means for maintaining some of said primary display material constantly at the projection point during the period of operation of the image projecting and display device for projection thereof by said optical system, secondary display material comprising movable slides, holding means for holding said slides in storage above the projection point, and conveying means for intermittently conveying the slides one by one at a rate slower than gravity toward and from the superimposed position over a period of said primary display material at the projection point for momentary illumination by said illuminating means and for momentary projection of its image by said optical system on to the display screen in combination with the image of the primary display material.

11. An image projecting and display device having a single display screen for displaying in combination thereon images of two different types of display material one of which is displayed continuously and the other at regular intervals, said image projecting and display device comprising a projection point for supporting both types of display material in position for projection thereof, illuminating means for illuminating the projection point and the display material thereat, an optical system for projecting an image of the display material at the projection point on to the single display screen, primary display material, supporting means for supporting said primary display material in said image projecting and display device, means for maintaining some of said primary display material constantly at the projection point during the period of operation of the image projecting and display device for projection thereof by said optical system, a plurality of display slides having trunnions attached thereto, a storage magazine for storing the slides, channeled guides for slidably receiving the trunnions attached to the slides, a plurality of reciprocating arms for engaging with said trunnions for intermittently and alternately moving the slides seriatim along the channeled guides from the storage magazine for momentary superimposition over a portion of said primary display material at the projection point for momentary illumination by said illuminating means and for momentary projection of its image by said optical system on to the display screen in combination with the image of the primary display material.

12. An image projecting and display device having a single display screen for displaying in combination thereon images of news material and advertising material, the news material being displayed continuously and the advertising material being displayed at regular intervals, said image projecting and display device comprising a projection point for supporting both the news and advertising material in position for projection thereof, illuminating means for illuminating the projection point and the news and advertising material thereat, an optical system for projecting images of the news and advertising material at the projection point on to the single display screen, a teletypewriter for printing news information upon page stationery, feeding means for continuously feeding the printed page stationery past the projection point for maintaining some of said printed page stationery constantly at the projection point during the period of operation of the image projecting and display device for projection thereof by said optical system, a plurality of advertising cards, holding means for holding said advertising cards in the image projecting and display device in a location away from the projection point, and conveying means for intermittently and alternately carrying the advertising cards one by one toward and from the projection point at regular intervals for momentary superimposition over a portion of the printed page stationery located at the projection point for momentary illumination by said illuminating means and for momentary projection of its image by said optical system on to the display screen in combination with the image of the news material.

GEORGE E. ATKINS.